United States Patent [19]

Boucquey

[11] 4,156,531
[45] May 29, 1979

[54] SEALING RING FOR FLEXIBLE TOOTHED COUPLING AND COUPLINGS PROVIDED WITH SUCH RINGS

[75] Inventor: Paul E. Boucquey, Berchem-Sainte-Agathe, Belgium

[73] Assignee: Esco Transmissions, Diegem, Belgium

[21] Appl. No.: 832,289

[22] Filed: Sep. 12, 1977

[30] Foreign Application Priority Data

Oct. 4, 1976 [BE] Belgium ............................... 846922

[51] Int. Cl.² .............................................. F16J 15/32
[52] U.S. Cl. .................................... 277/153; 277/63; 277/186
[58] Field of Search .................... 277/47, 63, 152, 153, 277/165, 166, 178, 186, 188 R, 189, 207 R, 225, 35, 38

[56] References Cited

U.S. PATENT DOCUMENTS

| | | | |
|---|---|---|---|
| 2,172,325 | 9/1939 | Victor et al. ........................... | 277/47 |
| 2,316,713 | 4/1943 | Procter ................................. | 277/153 |
| 2,833,577 | 5/1958 | Reynolds .......................... | 277/153 X |
| 2,926,938 | 3/1960 | Ratti ...................................... | 277/186 |
| 2,977,143 | 3/1961 | Talamonti ........................ | 277/178 X |
| 3,306,620 | 2/1967 | Taschenberg .................... | 277/153 X |
| 3,346,265 | 10/1967 | Rhoads et al. ......................... | 277/152 |
| 3,455,564 | 7/1969 | Dega ................................. | 277/153 X |
| 3,511,513 | 5/1970 | Dahlheimer ....................... | 277/38 X |
| 3,622,164 | 11/1971 | Herbert et al. ..................... | 277/63 X |

FOREIGN PATENT DOCUMENTS

| | | | |
|---|---|---|---|
| 4623682 | 5/1967 | Japan ...................................... | 277/153 |
| 1000879 | 8/1965 | United Kingdom ..................... | 277/153 |

*Primary Examiner*—Robert S. Ward, Jr.
*Attorney, Agent, or Firm*—Scully, Scott, Murphy & Presser

[57] ABSTRACT

A sealing ring of the so-called lip-fitted type, for toothed flexible couplings, which comprises a continuous unflexible ring-like armoring which is intended to form a removable part of said element, and a ring like spring which is to press the element lip on one coupling hub.

8 Claims, 6 Drawing Figures

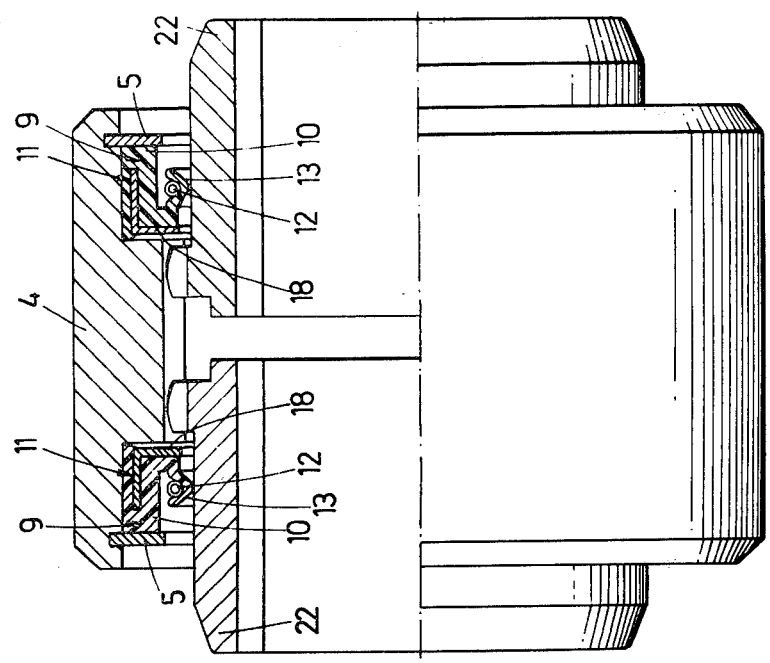
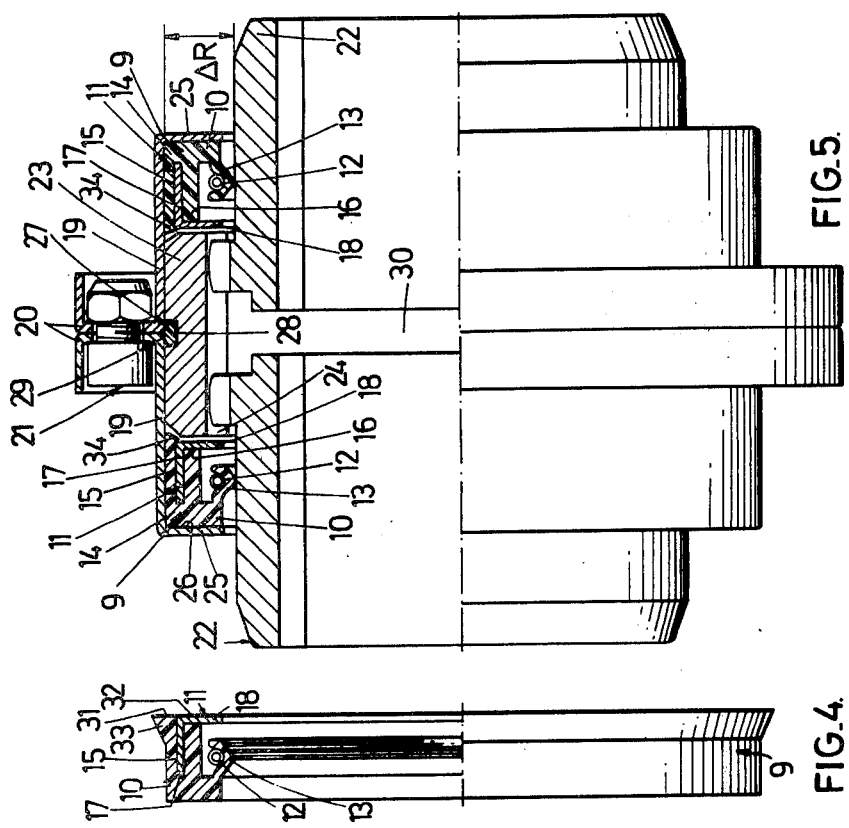
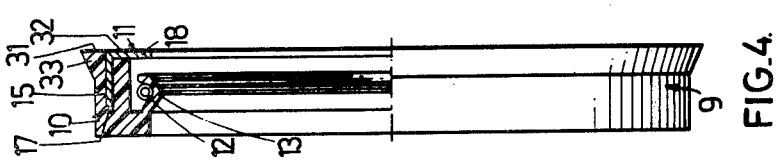

SEALING RING FOR FLEXIBLE TOOTHED COUPLING AND COUPLINGS PROVIDED WITH SUCH RINGS

This invention relates to a sealing ring of the so-called lip type, for flexible toothed couplings.

In flexible toothed couplings designed for the transmission of a torque from one shaft to another shaft the centerlines of which are difficult to align, there should be provided a sealed chamber filled with lubricant within which lie the outer teeth of the coupling hubs and the inner teeth of the sleeve connecting said hubs together.

In the prior art, chambers of this type have been provided with two kinds of sealing means which are selected according to the possible deviations of the shafts to be coupled. In the case of small deviations, use is made as shown in FIG. 1 of sealing rings 1 which are mounted in small plates 2 on the one hand to retain the rings in position and on the other hand to protect the rings against any engagement with the teeth when the hubs or the sleeve undergo an axial displacement. In the case of substantial deviations, use is made as shown in FIG. 2 of lip-fitted rings 3 which are retained inside the coupling sleeve 4 and actually through retaining rings 5 while being protected against any engagement with the teeth by means of small protecting plates 5'.

Both said kinds of sealing means have various drawbacks regarding both the manufacturing cost of the parts they cooperate with and the manufacturing cost of such means, and regarding the assembly and disassembly thereof. Indeed to design the sealing means as shown in FIGS. 1 and 2, a substantial $\Delta R$ has to be provided which results in a rather heavy sleeve having to be used. Moreover the length of said sleeve is markedly longer than the length of the sealed chamber to be provided. The price of the raw material and the machining costs are high particularly for the coupling as shown in FIG. 1, where the price of the material for the rings 2, the machining costs thereof, and the price of the fastening means on the sleeve have to be added to the manufacturing cost thereof.

When use is made of said two kinds of sealing means, any reduction of the sleeve cross-section can only occur at the expense of the hub diameter in that location where said hub contacts the sealing ring and thus at the expense of the largest bore which can be provided in the hubs. This limits the use of the coupling on machines having shafts with a small cross-section.

Regarding the costs of the sealing means proper, it may be stated that while the costs of the sealing rings 1 provided for couplings with small deviations are not high, the same is not true for the rings 3 fitted with a lip. Such lip-fitted rings are intended for couplings with substantial deviations. These rings require a metal armouring 3' and reinforcement fibers which are added to the resilient material of the ring during its manufacture. These features impart a substantial radial rigidity to the ring to ensure its sealing at the level of the sleeve inner surface and the hub outer surface and also provide a sufficient axial rigidity to enable the ring to with stand the axial pressure of the teeth engaging the protecting ring 5'.

The rigidity increase of said rings increases the costs thereof due to the increase in the preparation costs and the lowering of the rate with which the parts can be injection-molded. Finally as regards the assembly and disassembly of the sealing means, for the replacement thereof, it may be stated that while no problems are encountered in the case of sealing rings 1 as used with couplings having slight deviations, the replacement of rings with a damaged or worn-down lip, still requires the removal of at least one coupled machine from the foundation thereof. The hubs must then be disassembled from the shafts thereof, then relocated on the shafts and finally the coupled machines must be mounted back in that position they lay in relative to one another. These various operations, particularly the last one, are difficult to perform and result in high labor costs.

To make the replacement of lip-fitted rings easier and avoid the disassembly of the coupled machines, the use of reinforced split rings has been considered. The use of such rings has however the drawback that sealing failures occur along the split in the rings, mainly at the lip location when the machine shafts are substantially out of line.

It has also been proposed to lower the coupling costs, by using sealing rings 6 as shown in FIG. 3. Such rings are retained in position by flanges 7 which are connected together by fasteners 8. Such a system has the drawback that it does not allow substantial deviations and that the sealing rings 6 are not protected against engagements with the teeth of the coupling hubs and sleeve, in such a way that said sealing rings are rapidly worn-down and destroyed.

The invention has for object to obviate the above drawbacks and to provide a ring fitted with a lip for flexible couplings the manufacturing costs of which are substantially lower than the costs of the above-described armoured rings. Said ring which allows substantial deviations and which still insures a remarkable sealing, can be replaced without requiring the disassembly of the coupled machines and of the coupling hubs. Said ring has moreover the advantage of being provided with a protection whereby any engagement with the coupling teeth is prevented.

For this purpose the sealing ring according to the invention is formed by a continuous ring-like element from resilient material by a continuous unflexible ring-like armouring which is a removable part of said element, and by a ring-like spring which presses the element lip on one coupling hub.

In another embodiment of the invention, the ring-like element in that portion thereof extending opposite the lip, is provided with a circumferential groove which extends from one element side wall in parallel relationship with the axis line of the ring. Said groove is to form the bearing for the above-mentioned unflexible armouring.

In a preferred embodiment of the invention, the unflexible armouring has a L-shaped cross-section whereby the one leg of the L-shape is supported in said groove in the ring-like element, while the other leg of the L-shape bears on the side wall of said element along that side where the groove is provided, and extends in the direction of the lip.

In a particularly preferred embodiment of the invention, the ring-like element and the armouring with L-shaped cross-section are so designed that when said armouring leg enters the circumferential groove provided in the element, that ring-like element area lying between said groove and the element circumference lies substantially in the same plane as that armouring leg facing directly the element and bearing on said side wall of said element. This is accomplished in such a way that said element has such a circular projection that when the element is compressed in the direction of the centerline thereof, the material snaps back on the leg wall of said armouring to retain it fixedly in said element.

The invention has also for an object to provide a flexible coupling which is fitted with the above-described lip-fitted rings and particularly a coupling of the type as shown in FIG. 3.

Other details and features of the invention will stand out from the following description given by way of nonlimiting example and with reference to FIGS. 4 to 6 of the accompanying drawings, in which:

FIG 4 is a front view partly in cross-section, of a sealing ring according to the invention.

FIG. 5 is a front view partly in cross-section, of a flexible toothed coupling fitted with sealing rings according to the invention.

FIG. 6 is a view similar to FIG. 5 of a variation of the flexible coupling shown in such FIG. 5.

In the various figures the same reference numerals pertain to similar elements.

Figure 1:
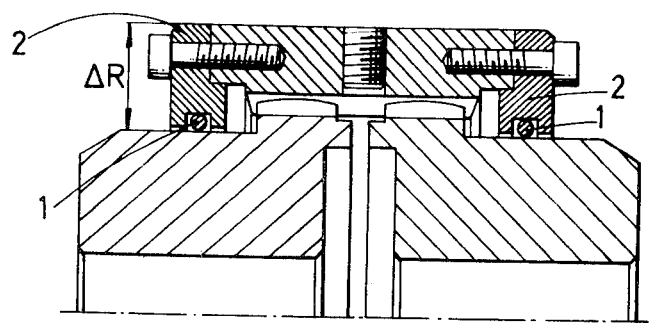
FIGS. 1 through 3 illustrate three different types of prior art sealing arrangements.

The flexible toothed couplings shown in FIGS. 5 and 6 are fitted with sealing rings 9 having a lip according to the invention as shown in FIG. 4. Said rings are comprised of a continuous ring-like element 10 from resilient material, of an unflexible ring-like continuous armouring 11 to be removably connected to element 10, and finally of a ring-like spring 12 for retaining the lip 13 of element 10 pressed against one of the hubs 22 of said coupling. The ring-like element 10 has in that portion 14 thereof facing the lip 13, a circumferential groove 15 which extends from the side wall 16 of said element in parallel relationship with the axis line of the ring and wherein the unflexible removable armouring 11 should fit. Said armouring is made from metal or from a molded synthetic material and has an L-shaped cross-section whereby the leg 17 of said L-shape is supported and retained in groove 15 while leg 18 thereof bears on the side wall 16 of element 10 to protect it from engagement with the coupling teeth.

Element 10 and armouring 11 are so designed that when armouring leg 17 enters element groove 15, that area 31 of said element 10 lying between groove 15 and the element circumference, lies substantially in the same plane as the wall 32 of armouring leg 18.

The element 10 has a circular projection 33 which is so designed that when the element is compressed along the centerline thereof, the material as shown in 34 in FIG. 5, presses down on wall 32 of leg 18 of armouring 11 to retain it fixedly in element 10. The presence of said projection 33 on element 10 has the advantage that the ring can insure a better sealing due to a better adapting thereof to the wide tolerances of the deep-drawn flanges 19 described hereinbelow. Moreover the presence of said projection 33 makes it easier to mount the rings in said flanges 19 because the largest portion of the rings which should contact said flanges can move therein with some play. Said projection which snaps down when element 10 is compressed, retains the armouring 11 in position inside said element 10 but also allows removing same when the rings are to be removed from the flanges 19, by pulling on the leg 18 of armouring 11 along the ring axis line for example by means of a screw-driver which is maintained in element 10 as any displacement of the armouring is automatically followed by a displacement of element 10. The projection 33 of element 10 has preferably a cross-section in the shape of a right-angled triangle whereby that triangle side which corresponds to the triangle height lies in that plane which passes through wall 32 of armouring leg 18, while the slanting side of said triangle makes of angle of about 20° with the centerline of the ring.

In the flexible coupling as shown in FIG. 5, the rings 9 are retained in position by two ring-like flanges 19 which are each provided with a circular projection 20. Said projections 20 are connected together by means of bolts 21 to form together with the rings 9, the hubs 22, and the sleeve 23 an oil-tight chamber for the lubricant, in which chamber lie the coupling teeth.

Each flange 19 has a wall 25 which bears on the side wall 26 of the resilient element 10, in such a way that said element is completely retained fixedly both by flange 19 and by armouring 11 to withstand the axial and radial forces and thus to insure an effective sealing while the element is also protected by the armouring 11 from any engagement with the teeth.

The sleeve 23 is provided on the outer side with a circular groove 27 which is equally spaced from the sleeve side walls and which is intended to be provided with a ring-like seal 28 which cooperates with the flanges where they contact the circular projections 20 to insure the sealing of the chamber 24 in that location. The flanges which are formed by stamping to lower the costs thereof, are provided with some play relative to the sleeve 23 while the presence of the seal 28 solves the problems of sealing and centering that result from the wide tolerances of the stamping work. Moreover due to the presence of the seal 28, it is possible when mounting the coupling to locate more easily the assembly location of the projections 20, in such a way that the position of the rings 9 relative to the sleeve 23 is automatically correct when the seal 28 enters the recess 29, which recess is formed where said flanges meet. When replacing the sealing rings 9, the procedure is as follows: the nuts on the screw bolts 21 are loosened, the bolts are removed, the flanges are spread away, the sleeve is removed from the hub teeth by sliding said rings on said hubs, the unflexible armourings 11 and the resilient elements 10 are removed as explained above by means of a screw-driver, the springs 12 are removed and the elements 10 without the armouring thereof are slid due to the resiliency thereof over the hub teeths and removed through the space 30 between said hubs. The assembly of the rings then occurs in the reverse sequence.

Figure 2:
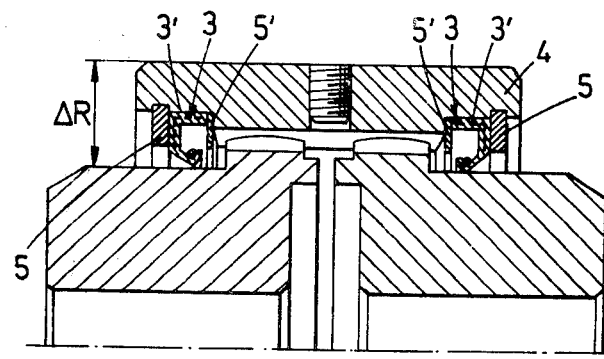
Figure 3:
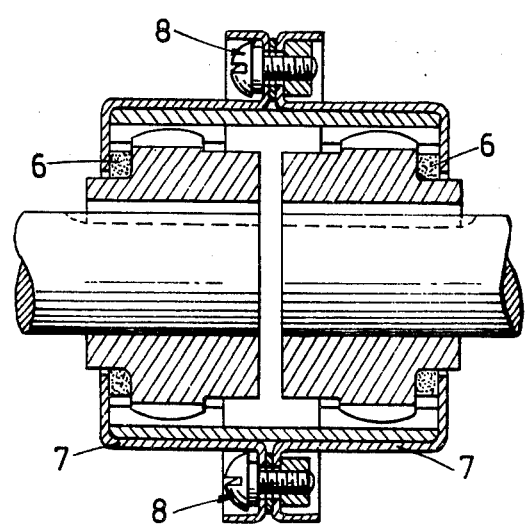

There appears from the above that the main advantages of the rings according to the invention lie in the resilient element being cheap, the armouring 11 being removable and re-usable, in such a way that but the resilient element and possibly the spring 12 have to be removed when replacing the ring 9, which can occur without the disengagement of the coupled machines and of the coupling hubs. With couplings as shown in FIG. 6, the rings 9 are identical to the above-described rings to the exception that the lips 13 on said latter rings face the opposite way so that they have no tendency to snap back when the rings are introduced inside the coupling sleeve 4. Said rings 9 are retained in position by retaining rings 5 which are similar to those springs provided in FIG. 2 and it is also no longer necessary to provide protecting plates 5' as used in the coupling according to FIG. 2, as leg 18 of armouring 11 protects the resilient element 10 against any engagement with the coupling teeth.

It must be understood that the invention is in no way limited to the above embodiments and that many changes can be brought therein without departing from the scope of the invention as defined by the appended claims.

I claim:

1. A sealing ring of the lip-fitted type for a toothed flexible coupling comprising, a ring-like element having a sealing lip, an L-shaped continuous unflexible ring-like armouring forming a removable part of said ring-like element, a circumferential groove provided in said element for one leg of said armouring and one leg of the L-shaped armouring being supported in said groove, a circular projection provided in said element in the area lying between said groove and the element circumference substantially in the same plane as that armouring leg directly facing the element and bearing on said side wall of said element, such that when the element is compressed in the direction of the centerline thereof the material snaps back on the leg wall of said armouring to retain same fixedly in said element, and a ring-like spring means for pressing said element lip against a coupling hub.

2. A sealing ring as defined in claim 1, said circumferential groove extending from one element side wall in parallel relationship with the central axis of the ring and providing a support for said unflexible ring-like armouring.

3. A sealing ring as defined in claim 2, the other leg of the L-shaped armouring bearing on the side wall of said element along that side where the groove is provided and extending in the direction of the lip.

4. A sealing ring as defined in claim 1, said circular element projection having a cross-section in the shape of a right-angled triangle whereby that triangle side which corresponds to the height lies in that plane which passes through the above-mentioned armouring wall and bears on the element side wall and the slanting triangle side defining an angle of approximately 20° with the circular element centerline.

5. A flexible toothed coupling including outer-toothed hubs on each axial side of an inner-toothed sleeve, each having a lip-fitted sealing ring as defined in claim 1.

6. A coupling as defined in claim 5, in which each of the lip-fitted sealing rings is mounted on each of the outer-toothed hubs on either side of the inner-toothed sleeve, said rings being retained in position by two ring-like flanges, each of which bears on one ring and on the sleeve and each flange having a circular projection, said projections extending substantially at right angle to the coupling axis and being joined together by screw bolts in such a way that the rings, the hubs, the sleeve and the flanges are bound together to form a sealed chamber which encloses the coupling teeth.

7. A coupling as defined in claim 6, in which each of said flanges has a wall at right angles to the coupling centerline and bearing on the ring side wall opposite the coupling sleeve, said groove provided in the ring-like element to receive the unflexible armouring extends from the ring side wall facing the coupling sleeve, and said armouring leg covering the ring wall lying adjacent to the sleeve.

8. A coupling as defined in claim 6, in which the sleeve is provided inwardly with a circumferential groove equally spaced from the sleeve side walls for supporting a ring-like seal which cooperates with said flanges where the flange circular projections meet.

* * * * *